Figure 1:
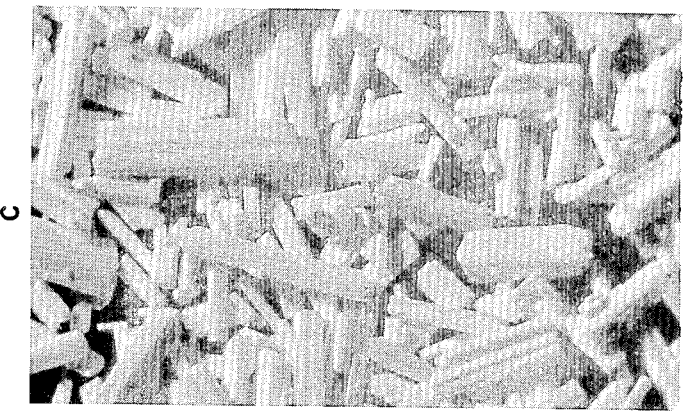
Figure 1:
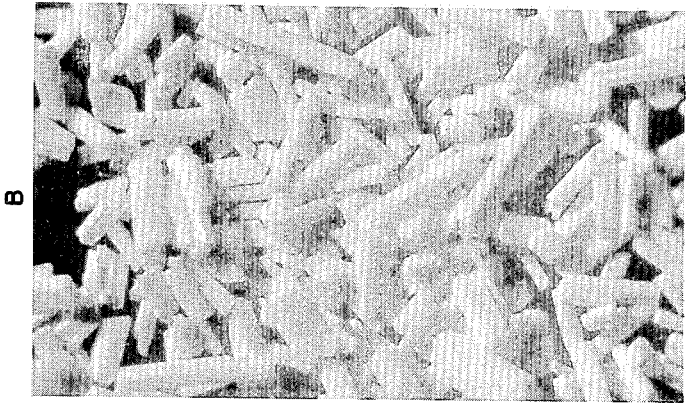
Figure 1:

Feb. 15, 1966  A. B. GANCY  3,235,329
NOVEL SODIUM CARBONATE-SODIUM BICARBONATE COMPOSITIONS
Filed Oct. 1, 1962  2 Sheets-Sheet 1

A — SODIUM SESQUICARBONATE PLANT CENTRIFUGE CAKE +100 MESH (30X)

B — "ANHYDROUS SESQUICARBONATE" SODA ASH (SODIUM CARBONATE) +100 MESH (30X)

C — (30X)

INVENTOR
ALAN B. GANCY
BY
ATTORNEYS

3,235,329
NOVEL SODIUM CARBONATE-SODIUM BICARBONATE COMPOSITIONS
Alan B. Gancy, Princeton, N.J., assignor to FMC Corporation, New York, N.Y., a corporation of Delaware
Filed Oct. 1, 1962, Ser. No. 227,502
9 Claims. (Cl. 23—63)

The present invention relates to novel sodium carbonate-sodium bicarbonate compositions which are pseudomorphs after precursor sodium sesquicarbonate monoclinic prismatic crystals, and to the method for producing these compositions.

Natural sodium sesquicarbonate $$(Na_2CO_3 \cdot NaHCO_3 \cdot 2H_2O)$$

is obtained by mining trona deposits in Sweetwater and adjacent counties in Wyoming. The mined trona is processed for recovery of the sodium sesquicarbonate by dissolving the trona in hot water. The solvent water is preferably mother liquor which has been recovered from a sesquicarbonate crystallization step described hereinafter. The hot solution containing about 25% solids is maintained at near boiling temperatures and pumped to clarifiers where removal of insolubles takes place. Activated charcoal is then added to the solution, followed by a filtration step. The charcoal removes impurities present in the aqueous solution. The solution is then cooled preferably in multiple effect vacuum crystallizers, and sodium sesquicarbonate crystals are precipitated from the solution and separated from the residual mother liquid by centrifuging the aqueous slurry. The supernatant mother liquor with added make-up water is returned to the dissolvers to dissolve more crude trona, and the cycle is repeated. This process is described in U.S. Patents 2,346,140, and 2,639,217. The separated sodium sesquicarbonate crystals are then dried and recovered. If desired, the dried sodium sesquicarbonate crystals then can be converted to soda ash by heating in a kiln; the crystals also can be utilized, as the product per se, for use in detergent compositions and other applications where mixtures of bicarbonates and carbonates are employed.

A serious drawback of the sodium sesquicarbonate crystals presently produced by these processes, is a greenish color which is imparted to the crystals by small quantities of sulfide compounds. These sulfides are present in the mother liquor under normal plant operating conditions. The greenish color is objectionable because many commercial users insist upon white sesquicarbonate crystals before incorporating them in their products e.g. detergent mixtures. This color can be removed by sequestrating agents, and other techniques but these procedures are too expensive for normal plant use. As a result sodium sesquicarbonate produced on a plant scale by the above processes, generally has an undesirable greenish cast.

Each molecule of crystallized sodium sesquicarbonate contains two molecules of water that constitutes about 16% by weight of the sodium sesquicarbonate molecule. Since the waters of hydration do not increase the sodium carbonate or sodium bicarbonate assay, they merely add to the shipping cost and are undesirable. As a result, there has been a need for a sodium carbonate-sodium bicarbonate mixture which has all the desirable advantages of sodium sesquicarbonate, i.e., free-flowing, non-dusting, non-caking and easily handled product, but which is free of any greenish cast and which does not contain any water in the crystal.

In addition, sodium sesquicarbonate, as obtained from the mined trona, contains only one mole of sodium bicarbonate for every mole of sodium carbonate. In many applications, it is desired to have a product containing higher proportions of sodium bicarbonate to sodium carbonate but which retains the desirable physical characteristics, e.g., free-flowing, non-dusting, and non-caking, of crystalline sodium sesquicarbonate. Physical mixtures of sodium bicarbonate and sodium carbonate are undesirable because they pick up water readily and become cakey and wet.

It is an object of the present invention to produce a white crystalline sodium sesquicarbonate containing sodium bicarbonate and sodium carbonate values in the mole ratio of 1:1, in the absence of any crystalline water.

It is a further object of the present invention to produce a white sodium bicarbonate rich crystalline product containing sodium bicarbonate and sodium carbonate in a mole ratio as high as 1.75:1, that is free of any crystalline water.

It has now been found that monoclinic prismatic crystals of sodium sesquicarbonate can be reacted with carbon dioxide at temperatures above 60° C. to yield a pseudomorph after sodium sesquicarbonate containing Wegscheider's salt ($3NaHCO_3 \cdot Na_2CO_3$) and sodium carbonate in mole ratios corresponding to the term:

$$(\tfrac{7}{15}-x)(3NaHCO_3 \cdot Na_2CO_3) + (1+\tfrac{5}{3}x)(Na_2CO_3)$$

where $x$ is a number from 0 to $\tfrac{7}{15}$.

The value of $x$ is determined by the extent of the reaction. When $x$ is zero, the product has maximum sodium bicarbonate; when $x$ is $\tfrac{2}{5}$, the product is anhydrous sodium sesquicarbonate; when $x$ is $\tfrac{7}{15}$, the product is sodium carbonate.

The pseudomorph after sodium sesquicarbonate contains a mixture of separate micro crystals of Wegscheider's salt ($3NaHCO_3 \cdot Na_2CO_3$) and sodium carbonate, within the outward pseudomorphic shape.

It is most surprising that a solid crystalline material, such as sodium sesquicarbonate, will combine with gaseous carbon dioxide at atmospheric pressure under relatively mild heating conditions to form a pseudomorphic product having a completely different internal crystalline structure than that of the original sodium sesquicarbonate reactant.

The basic reaction occurs according to the following equation:

EQUATION 1

$$Na_2CO_3 \cdot NaHCO_3 \cdot 2H_2O + \tfrac{1}{3}CO_2 \rightarrow$$
$$\tfrac{7}{15}(3NaHCO_3 \cdot Na_2CO_3) + \tfrac{1}{3}Na_2CO_3 + \tfrac{5}{3}H_2O\uparrow$$

The reaction proceeds quantitatively at temperatures above about 60° C. with $\tfrac{5}{3}$ moles of water being released for every mole of sodium sesquicarbonate treated. The Wegscheider's salt component thus formed is subject to decomposition at these elevated temperatures according to the following equation:

EQUATION 2

$$\tfrac{7}{15}(3NaHCO_3 \cdot Na_2CO_3) \rightarrow$$
$$\tfrac{7}{6}Na_2CO_3 + \tfrac{7}{10}H_2O\uparrow + \tfrac{7}{10}CO_2\uparrow$$

Above 125° C., and at a total pressure equal to one atmosphere (760 mm. Hg), Wegscheider's salt is decomposed as fast as it is formed according to Equation 2. Below 125° C., the Wegscheider's salt is increasingly more stable as the temperature is lowered. Accordingly, in order to obtain the highest possible sodium bicarbonate to sodium carbonate mole ratio of 1.75:1 ($\tfrac{7}{15}(3NaHCO_3 \cdot Na_2CO_3) + Na_2CO_3$), the reaction according to Equation 2 should be minimized. This can be accomplished by reacting the sodium sesquicarbonate and $CO_2$ at temperatures no higher than about 125° C. and by terminating the reaction after maximum amounts of Wegscheider's salt have been obtained in the pseudomorphic product.

Where "anhydrous sodium sesquicarbonate" is desired, that is, where a 1:1 mole ratio of sodium bicarbonate to sodium carbonate is desired, the products of Equation 1 are permitted to react further according to Equation 2 until the mole ratio of Wegscheider's salt to sodium carbonate is 1:2 in the pseudomorphic product. The resultant product has the same amount of sodium bicarbonate and sodium carbonate as the precursor sodium sesquicarbonate but lacks any crystalline water, even though it retains the same pseudomorphic shape; hence, the term, "anhydrous sodium sesquicarbonate," is applied to this product. Products having this bicarbonate to carbonate ratio or higher cannot be made by heating normal sodium sesquicarbonate in the absence of added $CO_2$, since diminution of the bicarbonate values always results upon heating.

While the above reaction takes place at substantially atmospheric pressure, it is to be understood that $CO_2$ containing gas streams at superatmospheric pressure may be employed in the same manner. At the higher pressures, increased amounts of $CO_2$ will react with the sodium sesquicarbonate crystals to yield somewhat higher bicarbonate to carbonate mole ratios than are obtained at atmospheric pressures. However, at substantially atmospheric pressure, which constitutes the preferred form of the invention because of ease of operation, the maximum mole ratio of sodium bicarbonate to sodium carbonate that can be obtained is 1.75:1.

The present invention will now be described with reference to the drawings.

Figure 2:
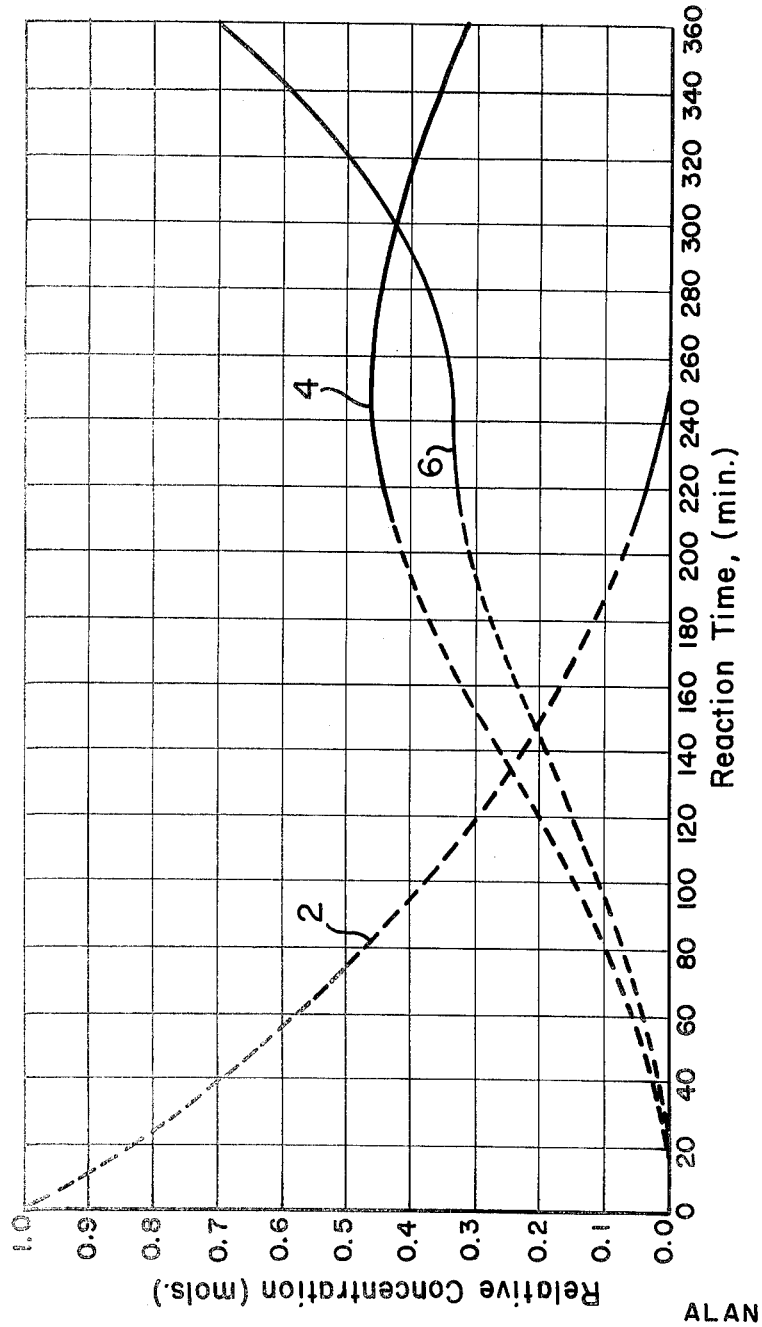

In the drawings,

FIGURE 1 represents photomicrographic reproductions of (a) The starting material, sodium sesquicarbonate,
(b) A product of the process, anhydrous sodium sesquicarbonate, and
(c) A further product of the process, soda ash (sodium carbonate), while FIGURE 2 represents in graphic form the results of Example IV, throughout the reaction.

In the drawings, FIGURE 1 shows the pseudomorphic form after sodium sesquicarbonate exhibited by anhydrous sodium sesquicarbonate and by sodium carbonate as produced in Example III.

In FIGURE 2 of the drawing, the results of an experiment, Example IV, in which sodium sesquicarbonate was reacted with carbon dioxide in a kiln maintained at a maximum temperature of about 120° C. ±5° C. are illustrated graphically. Carbon dioxide was swept through the kiln at a rate sufficient to keep the $CO_2/H_2O$ vapor pressure ratio at a high level. In the drawing, curve 2 represents the relative concentration in moles of sodium sesquicarbonate that was present in the reaction kiln, while curves 4 and 6 represent the relative concentration in moles of Wegscheider's salt and sodium carbonate, respectively. In the drawing, the relative concentration, in moles, of all these ingredients is plotted versus reaction time. As will be observed during the initial phase of this test, the amount of sodium sesquicarbonate represented by curve 2 decreases, while the amounts of Wegscheider's salt and sodium carbonate represented by curves 4 and 6, respectively, increase. These curves show the results of the reaction of sodium sesquicarbonate with carbon dioxide to form Wegscheider's salt and sodium carbonate in accordance with Equation 1. The reaction according to Equation 1 ceased after 260–270 minutes of reaction, at which point the Wegscheider's salt has reached its maximum concentration and the pseudomorphic residue contains $7/15(3NaHCO_3 \cdot Na_2CO_3) + 1/5 Na_2CO_3$. Thereafter, some of the Wegscheider's salt commences to decompose in accordance with Equation 2 to form sodium carbonate. This is readily seen by the decrease in the moles of Wegscheider's salt as the reaction proceeds beyond 270 minutes and by the rapid increase in the concentration of sodium carbonate when the reaction is carried out beyond 270 minutes. When the reaction proceeds to 354 minutes, the pseudomorphic product is "anhydrous sodium sesquicarbonate" containing

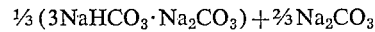

$$\frac{1}{3}(3NaHCO_3 \cdot Na_2CO_3) + \frac{2}{3} Na_2CO_3$$

If the reaction is allowed to continue until all of the Wegscheider's salt is decomposed, the final pseudomorphic product would be sodium carbonate.

In carrying out the present invention, a kiln, fluid bed or other suitable heat transfer means can be employed to contact the sodium sesquicarbonate with a carbon dioxide gas. In the case of the kiln, the sodium sesquicarbonate is fed into the kiln through one end and heated until the temperature of the sodium sesquicarbonate is about 125° C. Simultaneously, a carbon dioxide containing gas stream is fed into the kiln and permitted to continuously sweep over the tumbling sodium sesquicarbonate crystals. The sodium sesquicarbonate and carbon dioxide commence reacting in accordance with Equation 1 and water is evolved into the $CO_2$ containing vapor stream. By adjusting the flow rate of the $CO_2$ containing gas, the evolved water can be partially removed from the ambient $CO_2$ gas stream while the sodium sesquicarbonate crystals are undergoing this reaction.

In a kiln operation, it is desirable to remove water from that portion of the kiln in which the reaction illustrated by Equation 1 predominates because the presence of water tends to slow up this reaction by exerting its partial vapor pressure in the gas stream. At the same time, it is desirable to maintain some water vapor pressure downstream in order to stabilize the Wegscheider's salt against decomposition according to Equation 2. The removal of 2 moles of water per mole of sodium sesquicarbonate generally occurs in the first half of the kiln. Thereafter, the in-situ formed Wegscheider's salt decomposes downstream in accordance with Equation 2, giving off both water and carbon dioxide. Since this reaction produces carbon dioxide and water vapor, the removal of the water vapor in the gas stream above the solid reaction mass tends to accelerate this reaction. The extent to which the reaction expressed by Equation 2 is permitted to proceed depends upon the residence time of the crystal in the kiln. The exact time period required to produce a given bicarbonate to carbonate mixture must be determined by trial and error since this depends upon the rate of heat transfer between the kiln and the sesquicarbonate crystals, which is a function of the equipment being employed. In addition, the temperature of the sodium sesquicarbonate feed also determines the rate at which these reactions proceed. If a sodium bicarbonate to sodium carbonate mole ratio of 1.75:1 is desired, the residence time of the sodium sesquicarbonate in the kiln is fixed so that the reaction described by Equation 2 does not occur. This is most readily accomplished by heating the reaction mass to temperatures no higher than about 125° C. and removing the reaction product before the decomposition of the in-situ produced Wegscheider's salt commences.

If "anhydrous sodium sesquicarbonate" is desired, the residence time of the reaction product in the kiln maintained at no higher than 125° C. is allowed to proceed until the mole ratio of Wegscheider's salt to sodium carbonate in the total mass is 1:2. In any event, the resultant product is obtained as a pseudomorph after sodium sesquicarbonate and is most desirably employed in this form. However, for particular detergent use, these crystals may be ground for incorporation in detergent mixtures.

The particle density of the pseudomorphic product, anhydrous sodium sesquicarbonate, decreases by about 8%, compared with the precursor sodium sesquicarbonate. This change in particle density is due to the removal of water from the crystal which constitutes 16% by weight of the crystal. The full density loss obtained by a 16% reduction in weight is not realized, however, because a reduction in the crystal volume of about 9% also occurs. The cumulative result of losing crystallized water and of the shrinkage in crystal volume results in a decrease of about 8% in the particle density.

In addition to this natural decrease in particle density, the bulk density of the resultant pseudomorphic product after sodium sesquicarbonate can be controlled during manufacture by employing a selected size fraction of sesquicarbonate crystals as feed. Since the pseudomorphic product after sodium sesquicarbonate retains substantially the same crystal size, regulation of the size of the sodium sesquicarbonate crystals employed in the feed also controls the size of the final product and accordingly, the bulk density.

The resultant pseudomorphic product after sodium sesquicarbonate, including anhydrous sodium sesquicarbonate, is somewhat porous in nature and can absorb various liquid treating agents within these pores without becoming sticky or agglomerating. This is most desirable where the pseudomorphic product is to be employed in detergent mixtures and is to be treated with some organic agent. For example, the absorption of non-ionic wetting agents has been found greater with anhydrous sodium sesquicarbonate than with the starting compound, sodium sesquicarbonate. This high absorption property is believed due to the presence of porous fissures in the anhydrous sodium sesquicarbonate pseudomorph. This permits greater non-ionic wetting agent pick up, compared with sodium sesquicarbonate, which contains water molecules in place of the fissures found in the pseudomorph.

The resultant pseudomorphic product is advantageous over mixtures of sodium bicarbonate and sodium carbonate because it is more thermally stable than mixtures of these salts. This is due to the greater thermal stability of Wegscheider's salt, compared with that of sodium bicarbonate. Wegscheider's salt is a crystalline salt per se which contains 3 moles of sodium bicarbonate and 1 mole of sodium carbonate.

In the above reaction, it should be noted that the increase in the ratio of sodium bicarbonate to sodium carbonate in the pseudomorph after sodium sesquicarbonate is brought about by the increased stability of the Wegsheider's salt in the presence of water which is derived from the decomposition of the sodium sesquicarbonate. As can be readily observed from Equation 2, the presence of water vapor in the ambient atmosphere tends to reduce decomposition of the Wegscheider's salt, since water is one of the final products. Thus, when carbon dioxide is passed over the sodium sesquicarbonate, and Wegscheider's salt is formed in the ensuing reaction, the presence of gaseous carbon dioxide plus the presence of water vapor evolved during the reaction of sodium sesquicarbonate has a stabilizing effect on the Wegscheider's salt.

Thus, the water evolved from the reaction of sodium sesquicarbonate, by virtue of the vapor pressure it exerts, prevents the decomposition of Wegscheider's salt as it is formed and therefore permits the sodium sesquicarbonate to be converted to a pseudomorph having a higher ratio of sodium bicarbonate to sodium carbonate than was found in the original sodium sesquicarbonate crystal. Because of this, a dry $CO_2$ gas stream can be reacted, if desired, with the sodium sesquicarbonate since the partial pressure of water necessary to stabilize the in-situ formed Wegscheider's salt is evolved from the reaction of the sodium sesquicarbonate.

In the previous description of the process recited above, a portion of the water vapor was removed from the ambient carbon dioxide atmosphere in order to promote faster reaction. In many instances, however, it may be desirable to decrease the rate of the reaction illustrated by Equation 2 in order to make the residence time in the kiln less critical with respect to obtaining a particular bicarbonate to carbonate mole ratio in the product. This may be done by introducing water vapor into the $CO_2$ containing gas stream. The water vapor has the effect of slowing up the reaction rates such that the reaction described by Equation 2 proceeds at a much slower rate than that of Equation 1. This is advantageous since it decreases the criticality of residence time in the kiln and permits a processor to produce a product having a desired sodium bicarbonate to sodium carbonate mole ratio, even when the residence time of the reactant in the kiln varies somewhat. Since the residence time becomes less critical, this allows for ease of operation in the commercial application of the process. For example, at temperatures of 115° C., a partial pressure of at least 20 mm. of water maintained in a $CO_2$ gas stream will stabilize a product having the composition,

$$\tfrac{7}{8}(3NaHCO_3 \cdot Na_2CO_3) + Na_2CO_3$$

The following examples are given by way of illustration only and are not deemed to be limiting to the present invention.

EXAMPLE I

A 154.6±0.1 gram charge of sodium sesquicarbonate (air-dried −16 mesh) was placed in a 500 milliliter Morton flask. The flask was attached to a rotor and 100% $CO_2$ was passed into the flask through an axial rotary seal; the exit gases were passed out of the neck of the flask into the atmosphere. The flask was placed in an oil bath maintained at a temperature of 131.2° C. and was rotated within the bath. The $CO_2$ gas was passed into the rotating reactor at a rate of 3.0 liters per minute. After 73.0±0.5 minutes, the flask was raised out of the bath and allowed to rotate, with $CO_2$ gas still flowing until cool enough to handle. The new weight of the charge after the reaction was 130.1±0.1 grams. Chemical analysis of the material showed the following:

| | Percent $NaHCO_3$ | Percent $Na_2CO_3$ | Percent $H_2O$ |
|---|---|---|---|
| Test Results | 44.1 | 55.9 | 0.0 |
| Theory for Anhydrous Sodium Sesquicarbonate | 44.2 | 55.8 | 0.0 |

These chemical results indicated that anhydrous sesquicarbonate was present in the mixture to the extent of 99.8% with anhydrous sodium carbonate present in the amount of 0.2%. The crystals were examined under a microscope and were found to be pseudomorphs after the starting crystals with no agglomeration or apparent crystal deterioration. The sodium sesquicarbonate crystals were greenish and semi-translucent. After the reaction, they were converted to opaque white, having the same reflectance as soda ash made from sesquicarbonate except that these crystals appeared to be more vitreous. When examined by X-ray diffraction analysis, the product was found to be composed entirely of Wegscheider's salt and sodium carbonate.

EXAMPLE II

A 25.0 gram charge of sodium sesquicarbonate (air-dried −16 mesh) was introduced into a one-inch fluidized bed. The fluidizing gas was 100% $CO_2$ and was passed into the bed at a rate of 5.5 liters per minute. The bed walls were externally heated and the $CO_2$ was preheated such that the gas in the reaction chamber was at a constant temperature of about 119° C. before the addition of solid sodium sesquicarbonate. The reaction was terminated after 73 minutes and the charge was drawn off. The charge now weighed 21.0 grams and chemical analysis of the sample yielded the following:

Percent $NaHCO_3$ _____ 45.55
Percent $Na_2CO_3$ _____ 53.79
Percent $H_2O$ _____ 0.66

This defines a composition containing anhydrous sodium sesquicarbonate, 96.4%; $NaHCO_3$, 2.94%; $H_2O$, 0.66%. The crystals were examined under a microscope and were found to be pseudomorphs after the starting crystals with no agglomeration or apparent crystal deterioration.

EXAMPLE III

The procedure of Example I was repeated, employing the same sodium sesquicarbonate feed except that the reaction temperature, the applied gas composition, gas flow rate and reaction time which were employed are those reported in Table 1. The resultant compositions obtained are expressed in terms of an $x$ value in the formula $$(7/5-x)(3NaHCO_3 \cdot Na_2CO_3)+(1+5/2x)Na_2CO_3$$

and are reported in Table 1. In all cases, the resultant compositions were pseudomorphs after the starting sodium sesquicarbonate crystals.

Table 1

| Temp. (° C.)* | Applied Gas Composition | | Gas Flow Rate (l./min.) | Reaction Time (min.) | X Value |
|---|---|---|---|---|---|
| | Gas | Mole Percent | | | |
| 132 | CO$_2$ | 100 | 2.2 | 40 | 0.057 |
| 132 | CO$_2$ | 100 | 2.2 | 60 | 0.254 |
| 132 | CO$_2$ | 100 | 2.2 | 73 | [1] 0.400 |
| 132 | CO$_2$ | 100 | 2.2 | 180 | 1.154 |
| 136 | CO$_2$ | 100 | 2.2 | 170 | [2] 1.400 |
| 120 | CO$_2$ | 100 | 2.2 | 65 | 0.025 |
| 120 | CO$_2$ | 100 | 2.2 | 98 | 0.076 |
| 115 | CO$_2$ | 100 | 2.2 | 75 | 0.100 |
| 115 | CO$_2$ | 100 | 2.2 | 85 | 0.070 |
| 115 | CO$_2$ | 100 | 2.2 | 95 | 0.000 |
| 115 | CO$_2$ | 100 | 2.2 | 101 | 0.025 |
| 132 | CO$_2$+N$_2$ | 50 / 50 | 3 | 29 | 0.064 |
| 132 | CO$_2$+N$_2$ | 50 / 50 | 3 | 50 | 0.367 |
| 132 | CO$_2$+N$_2$ | 50 / 50 | 3 | 73 | 0.540 |
| 132 | CO$_2$+N$_2$ | 50 / 50 | 3 | 185 | [2] 1.400 |
| 132 | CO$_2$+N$_2$ | 25 / 75 | 3 | 31 | 0.544 |
| 132 | CO$_2$+N$_2$ | 25 / 75 | 3 | 52 | 1.191 |
| 132 | CO$_2$+N$_2$ | 25 / 75 | 3 | 83 | [2] 1.400 |

*Constant temperature of bath—actual temperature of solids varied but never rose above about 125° C.
[1] Anhydrous sodium sesquicarbonate.
[2] Sodium carbonate (soda ash).

EXAMPLE IV

A 25±0.5 pound charge of air-dried sodium sesquicarbonate centrifuge cake was loaded into a horizontal rotary kiln 2 feet in length and 1 foot in diameter. Dry room temperature CO$_2$ gas was allowed to flow into the reactor at the rate of 40±2 liters per minute. Gas burners were employed to heat the kiln. The solids temperature rose to a plateau of 102° C. in about 70 minutes. Thereafter, the temperature then rose slowly starting at 90 minutes to a temperature of about 120° C. in 200 minutes. A 100% yield of anhydrous sesquicarbonate was obtained after heating between 250 to 260 minutes. The composition of the reaction products was determined during the heating period and is tabulated in Table 2.

Table 2

| Time (min.) | Wegscheider's Salt (Moles) | Na$_2$CO$_3$ (Moles) | H$_2$O (Moles) | Sodium Sesquicarbonate (Moles) |
|---|---|---|---|---|
| 0 | 0.000 | 0.000 | 0.00 | 1.000 |
| 228 | 0.451 | 0.336 | 0.00 | 0.023 |
| 270 | 0.455 | 0.355 | 0.00 | 0.004 |
| 321 | 0.388 | 0.519 | 0.00 | 0.007 |
| 340 | 0.355 | 0.600 | 0.00 | 0.007 |
| 360 | 0.318 | 0.699 | 0.00 | 0.007 |

These results are graphically illustrated in the drawing.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The method of producing a pseudomorph after crystallized sodium sesquicarbonate having the formula $$(7/5-x)(3NaHCO_3 \cdot Na_2CO_3)+(1+5/2x)(Na_2CO_3)$$

where $x$ is a number from 0 to 7/5, which comprises reacting sodium sesquicarbonate crystals with CO$_2$ at a temperature of above about 60° C. for a period of time sufficient to obtain the desired value of $x$ from 0 to 7/5, and recovering a pseudomorphic product having an external configuration that is identical with said precursor crystals of sodium sesquicarbonate.

2. Process of claim 1 in which $x$ is 2/5 and said pseudomorphic reaction product has the formula $$(3NaHCO_3 \cdot Na_2CO_3)+2Na_2CO_3$$

3. Process of claim 1 in which said reaction takes place at a temperature of from about 60° C. to about 125° C.

4. Process of claim 1 in which said reaction takes place at substantially atmospheric pressure.

5. Process of claim 1 in which $x$ is 0 and said pseudomorphic reaction product has the formula $$7/5(3NaHCO_3 \cdot Na_2CO_3)+Na_2CO_3$$

6. Process of claim 1 in which said CO$_2$ in contact with said sesquicarbonate contains water vapor.

7. As a new composition of matter, non-caking, non-dusting granules consisting essentially of Wegscheider's salt and sodium carbonate having the formula $$(7/5-x)(3NaHCO_3 \cdot Na_2CO_3)+(1+5/2x)(Na_2CO_3)$$

where $x$ is a number from 0 to 2/5, and said granules are pseudomorphs after sodium sesquicarbonate.

8. As a new composition of matter, non-caking, non-dusting granules consisting essentially of Wegscheider's salt and sodium carbonate having the formula $$7/5(3NaHCO_3 \cdot Na_2CO_3)+Na_2CO_3$$

in which said granules are pseudomorphs after sodium sesquicarbonate.

9. As a new composition of matter, non-caking, non-dusting granules consisting essentially of Wegscheider's salt and sodium carbonate having the formula $$(3NaHCO_3 \cdot Na_2CO_3)+2Na_2CO_3$$

in which said granules are pseudomorphs after sodium sesquicarbonate.

References Cited by the Examiner

UNITED STATES PATENTS

| 1,583,660 | 5/1926 | Cocksedge | 23—63 |
| 1,583,661 | 5/1926 | Cocksedge | 23—64 |
| 1,583,662 | 5/1926 | Sundstrom et al. | 23—64 |

MAURICE A. BRINDISI, *Primary Examiner.*